United States Patent Office 3,733,383
Patented May 15, 1973

3,733,383
DEFORMATION OF POLYMERIC MATERIALS
John Brian Bunney and Christopher Cassin, Runcorn, England, assignors to Imperial Chemical Industries Limited, London, England
Filed July 9, 1970, Ser. No. 53,585
Int. Cl. B29c 23/00, 17/00
U.S. Cl. 264—88
14 Claims

ABSTRACT OF THE DISCLOSURE

A process for the reduction of the cross-sectional area of an article of thermoplastic polymeric material by drawing it through a well-lubricated die, at least that part of the article to which the draw-stress is applied being prestrengthened by molecular orientation. A preferred form of the process involves applying a substantial draw-stress to the extrudate from a hydrostatic extrusion process. Extruded and/or drawn articles of thermoplastic polymers may be produced having a hitherto, unattainable degree of molecular orientation, and, hence, physical properties, e.g., modulus. It is also possible to overcome the excessive relaxation of the product hitherto associated with the application of hydrostatic extrusion to such materials.

This invention relates to the deformation of polymeric materials and especially to the solid-phase drawing of thermoplastic polymeric materials.

It is known that the cross-sectional area of metals may be reduced by drawing them through a die, as in the well known wire drawing processes. However, attempts to adapt such a process directly to thermoplastic materials have resulted in premature breakage of the materials on the exit side of the die because the forces resisting passage of the material through the die readily induce stresses in the product which exceed its ultimate tensile strength.

According to the present invention, a process for reducing the cross-sectional area of an article of an orientable thermoplastic polymeric material comprises drawing the article, at a temperature below its melting point, through a die of smaller cross-sectional area than that of the article, the deforming surface of the die being well lubricated and the molecular orientation of at least that part of the article to which the draw tension is applied being such that the tensile strength of said part of the article exceeds the draw tension.

Hereinafter, for the sake of simplicity, deformation of an orientable thermoplastic polymer material at a temperature below its melting point by any process will be referred to generically as "solid-phase" deformation.

Within the term "article" as used in this specification, we include bars, strips, rods, tubes and other forms of solid or hollow stock. However, we specifically exclude articles having cross-sectional areas less than 0.01 square inch and whose largest external dimension is less than 0.05 inch.

Figure 1:
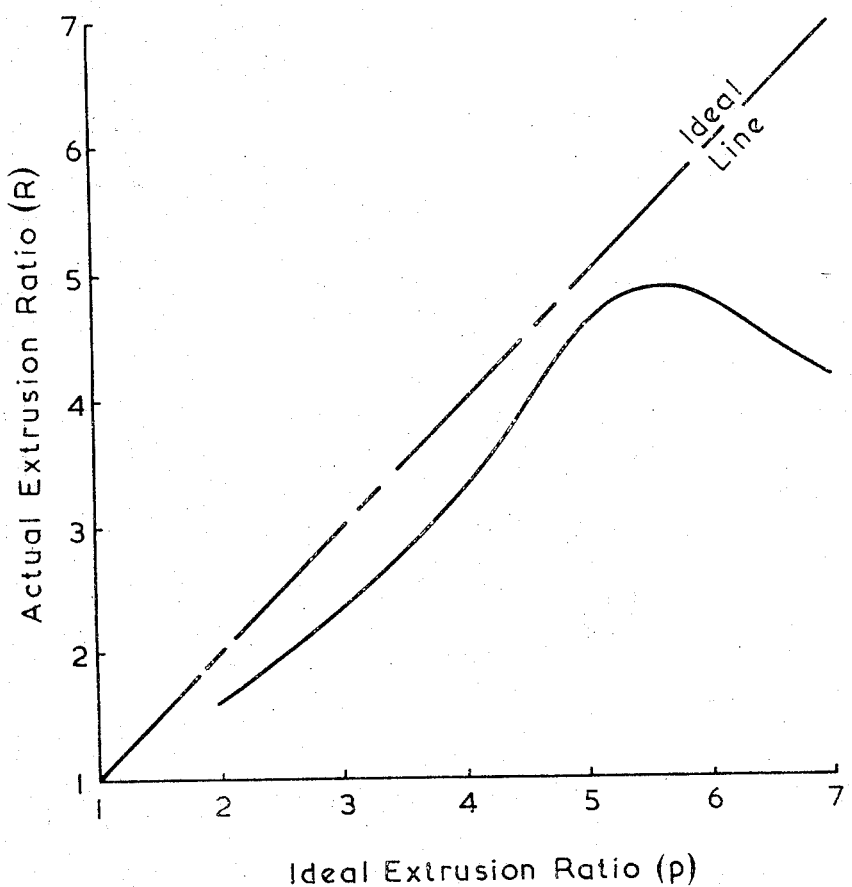
Figure 2:
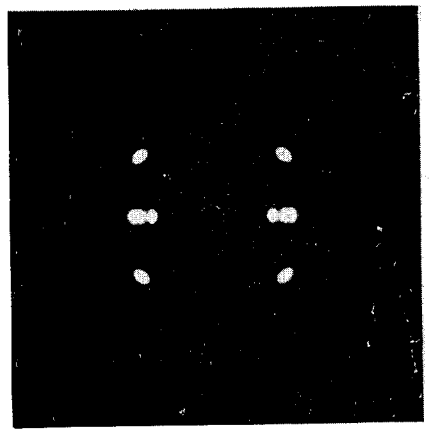
Figure 3:
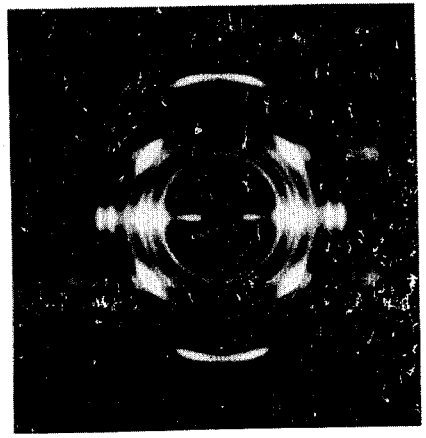
Figure 4:
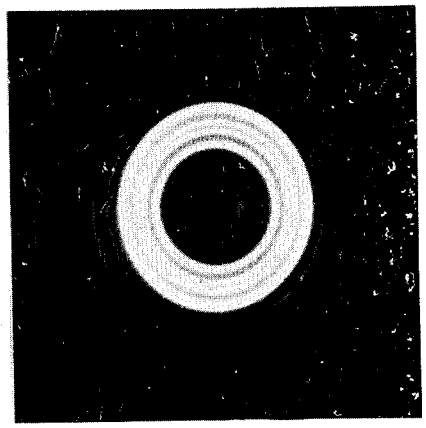
Figure 5:
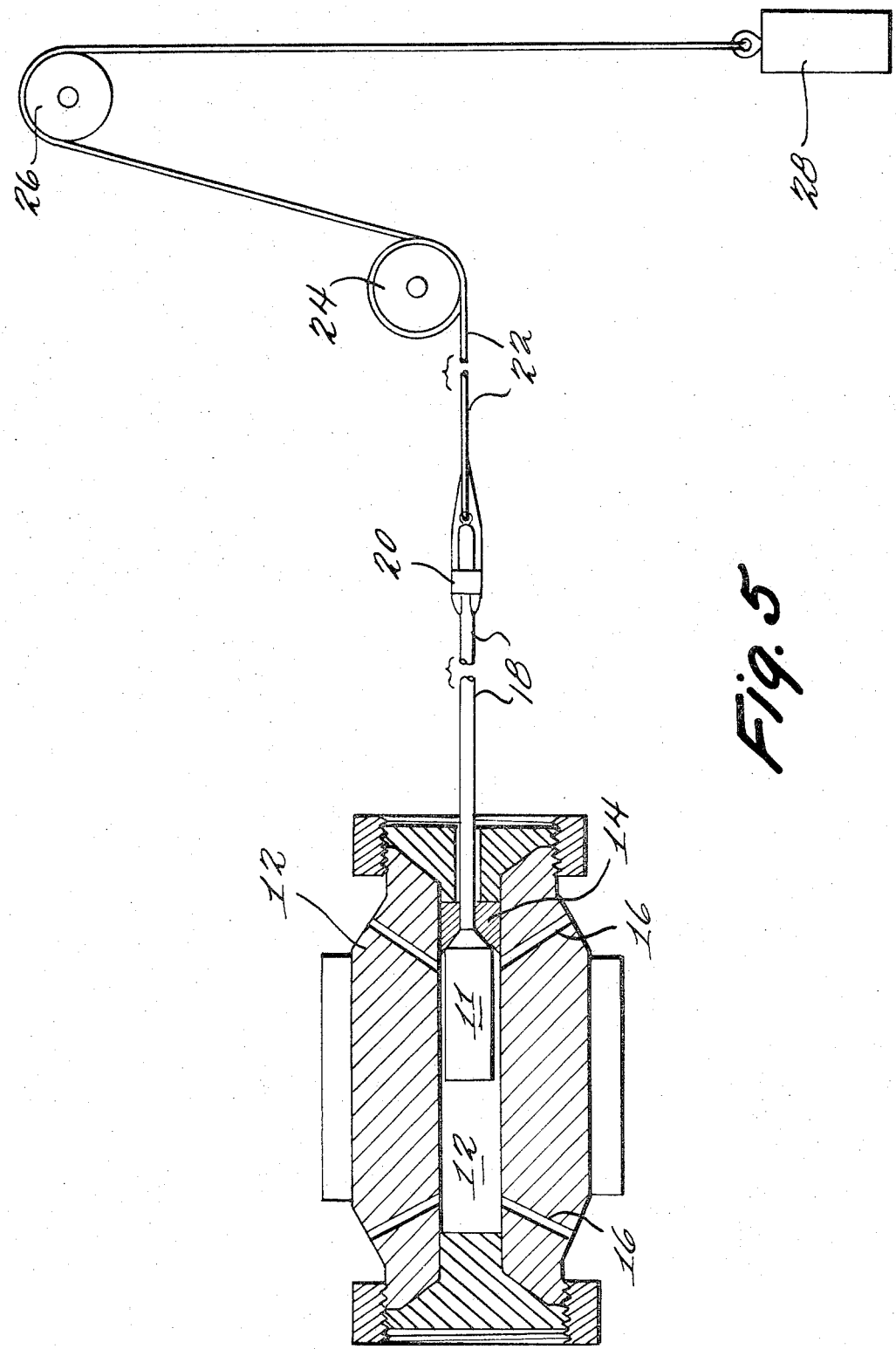

In the drawings:
FIG. 1 is a graph of actual extrusion ratio versus ideal extrusion ratio for a given billet of polypropylene;
FIG. 2 is an X-ray diffraction pattern of a polypropylene rod prepared by the process of the present invention;
FIG. 3 is an X-ray diffraction pattern of an extruded polypropylene rod prepared without draw assistance;
FIG. 4 is an X-ray diffraction pattern of an unextruded polypropylene billet; and
FIG. 5 is a schematic sectional view of apparatus suitable for carrying out the process of the present invention.

Thermoplastic materials which may be successfully subjected to our process are those in which molecular orientation may be induced by solid-phase deformation with consequent modification of their physical properties, in particular their tensile strengths. Examples of materials which may be subjected to our process include polyolefins, such as polyethylene and polypropylene and including copolyolefins; polyamides such as the nylons and including copolyamides; polyaldehydes, such as polyacetal; polyesters, such as polyethylene terephthalate and polybutylene terephthalate and including copolyesters.

Thermoplastic materials incorporating fillers may also be used. Examples of useful fibrous fillers are glass fibres, asbestos, metal fibres, especially steel fibres, carbon fibres and ceramic whiskers, such as those formed from silicon carbide. Examples of laminar materials are mica and graphite flakes.

The degree of orientation required in the thermoplastic material to impart sufficient tensile strength to that part of it which is under tension will depend upon several factors, such as the nature of the material, the amount of deformation to be applied to it during passage through the die, the efficiency of the lubrication and the temperature of the material, but may be readily determined by experiment. This preliminary orientation may be induced in the material by a variety of solid-phase deformation processes well-known in the art, for example, by extrusion, rolling or forging.

Efficient lubrication of the die surface is most important to the success of our process and is preferably achieved by forcing lubricant into the article/die interface under pressure. Satisfactory results may be obtained with a variety of lubricants. For example, mineral or vegetable oils and synthetic oils, such as those derived from silicones, may be used; but silicone oils are generally preferred because of their thermal stability and their excellent lubricity with respect to plastics.

In a preferred form of our process, die surface lubrication and orientation of the appropriate part of the article are achieved simultaneously by using a modified hydrostatic extrusion process.

The general technique of hydrostatic extrusion is described by Pugh and Low in "The Hydrostatic Extrusion of Difficult Metals" Journal of the Institute of Metals, 93, pp. 201–217, 1964/5, and by H. Ll. D. Pugh in the Bulleid Memorial Lecture for 1965 "Recent Development in Cold Forming." Reference is made therein to the possibility of applying the technique to thermoplastic materials, the extrusion of polyethylene at an extrusion ratio of 4/1 being exemplified.

However, when hydrostatic extrusion is applied to thermoplastic materials there is always a certain amount of "relaxation" of the extrudate. That is to say, the extrudate is always of greater cross-sectional area than the orifice of the die. In order to express this effect in numerical terms, we will hereinafter refer to the ratio of cross-sectional area of the billet to that of the die orifice as the "ideal deformation ratio" and the ratio of the cross-sectional area of the billet to that of the die orifice as the "ideal deformation ratio" and the ratio of the cross-sectional area of the billet to that of the die orifice as the "ideal deformation ratio" and the ratio of the cross-sectional area of the billet to that of the extrudate as the "actual deformation ratio." In this context, we intend the term "deformation" to include extrusion and/or drawing.

In order to quantify this effect, we measured ideal and actual deformation ratios over a range of values, plotting one against the other.

A typical hydrostatic extrusion pattern is as shown in FIG. 1 of the accompanying drawings, which relates to the extrusion of polypropylene billets at 120° C. with a 0.3″ diameter die having a 30° included die angle. It will be seen from this graph that at ideal deformation ratios up to about 5.5/1 the actual deformation ratio (as indicated by line CD) fell short of the ideal (as indicated by line AB) by a substantially constant amount which may be taken as representative of the degree of relaxation of the material in issuing from the die and thus being released from the constraint of the die orifice. However, once the value of 5.5/1 had been exceeded, further increase in ideal deformation ratio, for example by forcing billets of greater cross-sectional area through the die, actually resulted in the production of extrudates of lower actual deformation ratio because of excessive relaxation (as indicated by line DE). When the temperature of the extrude was lowered to 100° C. in an attempt to lessen this excessive relaxation, the result was partially successful (as indicated by lines DF and DG); but inspection of the products showed that they contained brittle fractures and, in extreme cases, the products shattered on issuing from the die. Thus it became apparent that there was a deformation ratio "boundary" at about 5.5/1 ideal or 5.1/1 actual deformation ratio in the case of polypropylene under the above conditions, above which further increase in ideal deformation ratio had no useful effect. Subsequent analogous experiments with other orientable thermoplastics proved this to be a general effect, the numerical value of the boundary ratio varying to a marked degree from material to material, but also varying to a small degree with change of extrusion conditions, e.g. temperature.

Attempts to break out of this boundary by varying the known parameters of the process were unsuccessful, until it was discovered that the application of a considerable draw tension to the extrudate gave rise to significant and unexpected advantages.

According to a further aspect of our invention, a process for reducing the cross-sectional area of an article of an orientable thermoplastic material in which the article is drawn through a die of smaller cross-sectional area than that of the article at a temperature below its melting point, comprises subjecting the article, in the form of a billet, to a hydrostatic extrusion process and applying to the issuing extrudate a deforming draw tension, as hereinafter defined. By a hydrostatic extrusion process we mean a process snd applying to the issuing extrudate a deforming draw tension, as hereinafter defined. By a hydrostatic extrusion process we mean a process such as that described in the aforementioned paper by Pugh and Low.

The phrase "deforming draw tension" is defined as a tension sufficient to cause a substantial permanent reduction in cross-sectional area and increase in length of the reduced article or extrudate additional to that caused by the hydrostatic extrusion process under the prevailing conditions, but insufficient to cause fracture of the extrudate or to cause the formation therein of local constrictions of the type variously referred to as "necking" or "cold-drawing" of polymers (see, for example, "Mechanical Properties of Polymers," L. E. Neilsen, Rheinhold Publishing Corporation, 1962, pp. 105 to 108). It is noted that the application of tensional forces (e.g. <100 p.s.i.) such as would, for example, merely ensure straightness of the extrudate are specifically excluded. The precise magnitude of the draw tension required will depend upon the properties of the thermoplastic material being deformed the conditions under which the process is carried out and the properties desired in the final product; but it may be readily determined by experiment. Preferably the draw tension is such that the actual deformation ratio is at least equal to the ideal deformation ratio, so that the product suffers no relaxation. The advantage of this is that during such relaxation the molecular orientation of the product changes in a way which has an adverse effect on it s physical properties, especially its modulus.

Ideally the draw tension is selected so that the actual and ideal deformation ratios are equal. This condition may be readily achieved by the application of our process, especially that aspect of it in which a deforming draw stress is applied to the extrudate from a hydrostatic extrusion process, as will be appreciated from the subsequent experimental section. When achieved, this last mentioned condition provides not only the general advantage mentioned above; but also permits the formation of products having cross-sectional dimensions equal to those of the die orifice. This is particularly important when producing products having cross-sections other than circular or near circular, for example, T- or I-section bars, in which either relaxation or draw-down (as hereinafter defined) prevents the formation of products having cross-sections which are accurate reproductions of the shape of the die-orifice.

Thus our process may be utilised advantageously in two ways. For example, it may be used to achieve actual deformation ratios in thermoplastics greater than those previously attainable by known drawing and/or extrusion processes, or it may be used to form products having actual deformation ratios previously achievable, but only by accepting the previously inevitable relaxation with the attendant reduction in certain physical properties, e.g. modulus.

With regard to the first-mentioned application of our process, the actual deformation ratios referred to are those above the deformation ratio barriers previously mentioned. Examples of average values for these are:

Polypropylene _____ 5.1/1
Nylon 6.6 _____ 4.4/1
Polyacetal _____ 4.5/1
Polyethylene terephthalate _____ 3.5/1
Polyvinyl chloride _____ 2.1/1
Glass-fibre filled polypropylene _____ 5.8/1 the precise values varying slightly with actual process condition, particularly temperature and extrudate velocity.

These ratios may also be related to the degree of molecular orientation in the product, and, since this has a marked effect on certain physical properties of the products, in particular their moduli, it follows that the use of our process can enable extruded and/or drawn articles (other than those of dimensions previously excluded) to be produced having moduli higher than those previously attainable. Thus a further aspect of our invention resides in such products as novel articles.

For some applications, it may be advantageous to reduce the degree of orientation of the surface layers of article according to our invention, since slight surface scoring, which may occur during extrusion or at any time in the service life of the article may drastically reduce its impact strength. A suitable reduction of this degree of orientation is readily achieved by briefly heating the surface layer up to or slightly above the melting point of the thermoplastic matrix.

In order to illustrate, by way of example only, the various aspects of our invention we detail below the results of several series of experiments, some of which fall within the scope of our invention and some of which are included by way of comparison.

Firstly, a generalised description of our modified hydrostatic extrusion process will be given with reference to FIG. 5. For convenience, we will hereinafter refer to this form of our process as "draw-assisted hydrostatic extrusion."

Referring to FIG. 5 a billet 10 of suitable size for introduction into the bore 11 of an extruder barrel is prepared by conventional techniques, for example by melt forming of the thermoplastic material (blended with filler if necessary) followed by solidification and shaping by a moulding or melt extrusion process. It is important that any filler is evenly distributed throughout the matrix and that the material itself is substantially homogeneous i.e. it should be free from variations in density throughout its mass. It should also be free from voids. If such conditions are not met the extrudate may be uneven, blistered and may contain zones of weakness.

It is advantageous to form the end of the billet 10 nearest the die to such a shape that it forms a reasonably fluid-tight seal with the die to prevent loss of hydrostatic fluid when extrusion is commenced. The die 14 orifice cross-section is of course selected according to the shape of product required. The billet is inserted into the extruder barrel, and the hydrostatic fluid is introduced through entry ports 16. The hydrostatic fluid is selected on the basis of its ability to lubricate metal-thermoplastic interfaces, its limited compressibility and limited temperature dependence of compressibility. It will be appreciated that the lubricant must not interact with the thermoplastic material in a way which will adversely affect the properties of the product. Most hydraulic oils are suitable and silicone oils are particularly useful. In the experiments detailed below, silicone fluid F111/300 was used.

Before extrusion is commenced, the whole of the billet and die should be brought to a substantially constant temperature. Unless care is taken to eliminate regions of variable temperature within the billet uneven extrusion may occur and the extrusion velocity may be difficult to control. For example, if the billet temperature is higher than the die temperature, the end of the billet brought into contact with the die will be cooled so that, when the exrusion is commenced, the higher pressure needed to initiate extrusion of the cooled end of the billet will be greater than the pressure needed to maintain a steady rate of extrusion of the main part of the billet. The result may be a very rapid and uncontrollable extrusion of the remainder of the billet.

mainder of the billet. Such a nose 18, whether produced by hydrostatic extrusion or some other form of solid-phase deformation such as drawing or forging, will be hereinafter referred to as an "integral preferentially oriented nose." The end of this extrudate is then grasped by a pair of self-gripping jaws 20 attached to one end of a high tensile cable 22 which passes over a pulley 24, the other end being attached to a winch 26 which enables weights 28 of up to one ton to be suspended from the other end of the cable so as to exert a constant tensional force on the extrudate. Simple hydrostatic extrusion is thereafter replaced by the combination of hydrostatic extrusion and drawing previously referred to as draw-assisted hydrostatic extrusion.

The first series of experiments, the results of which are set out below in Table 1, involved the extrusion of a series of polypropylene melt-extruded cylindrical billets, the draw tension and hydrostatic extrusion pressure being varied over a complete spectrum, that is from nil to an upper value of several thousand pounds per square inch.

Billet diameter: 0.704"
Extruder die:
    0.3" diameter
    30° included angle
Ideal deformation ratio: 5.5/1
Starting temperature: 100° C.
Extrudate velocity: 5 inches/minute

TABLE 1

| | | | | Mechanical properties | | |
|---|---|---|---|---|---|---|
| Draw tension (p.s.i.) | Hydrostatic extrusion pressure (p.s.i.) | Difference between die and extrudate diameters (inches ×10$^{-3}$) | Actual deformation ratio | Modulus secant at 0.2% strain (p.s.i.) (×10$^5$) | Break stress (p.s.i.) (×10$^3$) | Break strain (percent) |
| Relaxation: | | | | | | |
| 0 | 10,000 | +18 | 4.91 | 5.47 | 29.4 | 20 |
| 25 | 9,750 | +16 | 4.96 | 4.84 | 29.0 | 19 |
| 85 | 10,000 | +13 | 5.06 | 5.45 | 30.0 | 18 |
| 293 | 9,200 | +7 | 5.26 | 5.66 | 31.7 | 16 |
| Preferred process condition: 700 | 8,500 | 0 | 5.5 | 6.60 | 33.4 | 15 |
| Draw down: | | | | | | |
| 1,000 | 8,200 | −3 | 5.02 | 7.49 | 34.5 | 14 |
| 1,860 | 6,800 | −7 | 5.76 | 7.15 | 35.9 | 15 |
| 3,350 | 4,520 | −29 | 6.74 | 8.47 | 40.0 | 12 |
| 4,500 | 3,600 | −39 | 7.28 | 9.85 | 49.0 | 11 |
| 6,080 | 0 | −89 | 11.1 | 21.0 | 65.9 | 6 |

In general, our process may be conducted at any temperature, provided that the material remains in the solid phase throughout the process and the condition of the material is such that it may be drawn through the die.

The actual temperature used for extrusion depends mainly upon the thermoplastic material used for the matrix; but factors such as the extrusion ratio, the desired speed of extrusion and the size of the product required also affect the choice of temperature.

For example, for polypropylene, temperatures from ambient up to 140° C. may conveniently be used. Use of the higher temperatures in this range allows reduction of the pressure required to cause extrusion; but at temperatures above 120° C., product properties begin to fall below optimum. The best products in terms of tensile properties are obtained at about 90–110° C. Nylon 6.6 is not as susceptible as polypropylene to variations in product properties with extrusion temperature, and thus, temperatures in the range 100 to 200° C. may be conveniently used. Polyethylene terephthalate may be conveniently extruded in the range from 100 to 200° C. whereas for polyacetal the optimum extrusion temperature is about 120° C.

Extrusion is commenced and continued until an extrudate of about 6 inches in length, hereinafter referred to as the "nose," has issued from the die 14. It will be appreciated that this nose 18 is integral with and possesses a higher degree of molecular orientation than the re- The increase in modulus indicated in the above table was related to increase in molecular orientation of the products by means of birefringence measurements. These involved measuring the difference in refractive index along 2 perpendicular principal axes in suitable sections cut from the material, one of the principal axes being the extrusion direction. A description and discussion of birefringence measurements is made in chapter 22 of "Physical Properties of Textile Fibres" by W. E. Morton and J. W. S. Hearle, published by Butterworth and Co. (Publishers) Ltd., and The Textile Institute (1962). An unoriented sample has a birefringence of zero and with increase in orientation the birefringence increases. For the products obtained in the experiments of Table 1, the birefringence increased with increase in actual deformation ratio from a birefringence of 0.023 at an actual deformation ratio of 4.91 up to a value of 0.032 at an actual deformation ratio of 11.1.

The mechanical properties of products were evaluated by the test methods set out in the Appendix to A.S.T.M. D 638–61T, 1962 and are expressed in the way defined in that Appendix.

Hereinafter in this specification and in the claims modulus figures will be expressed simply as "p.s.i. × 10$^5$"; but it is to be understood that such figures are secant moduli at 0.2% strain measured in accordance with the aforementioned A.S.T.M. reference.

In each case, a billet was subjected to the process under the conditions shown in the table and 30" of extrudate produced under steady conditions. It will be appreciated that the hydrostatic pressure used to produce the aforementioned "nose" was in many cases considerably greater than the steady state value shown.

From the above results it will be seen that by varying the draw tension and hydrostatic extrusion pressure the process can be made to function in one of three ways. Firstly, operation with no, or only a small, draw tension so that the product exhibits relaxation; secondly, in our preferred manner, in which the draw and extrusion forces are balanced to produce a stable product in which there is no measurable relaxation; and, thirdly, in such a way that the final cross-section of the product is less than that of the die orifice (referred to herein as "draw-down"). It will also be noticed that it is possible to reduce the hydrostatic extrusion pressure in the steady state to zero so that the process consists of drawing alone.

It will be noted that considerable improvement in physical properties is obtained, especially with regard to modulus.

With regard to the experiments in which "draw-down" was obtained, even better physical properties were obtained and operation in this way is within the scope of our invention. When operating under conditions of draw-down, the aforementioned reduction in physical properties associated with relaxation are avoided. The second condition is only preferred because it is possible to obtain a very close dimensional tolerance in this way.

It is important to note that the phenomenom referred to as "draw-down" is quite distinct to that previously referred to as "necking" or "cold-drawing." "Draw-down" does not entail the formation of an uncontrolled localised constriction, as in "necking," which occurs at some point of weakness or inhomogeneity in the material which is frequently remote from the die. The resulting deformation is uncontrolled in the further sense that for a specific set of environmental conditions it occurs at just one value of tensile stress and is associated with just one terminal dimension. In this way, necking is essentially a step-function whereby equilibrium can be established either with or without the local constriction but at no intermediate deformation level since the application of a tensile stress even slightly less than that associated with necking will induce substantially no permanent deformation. Draw-down, however, within our definition can be utilised at all stress levels and a relationship exists between the magnitude of draw stress and the final dimensions of the product for any particular set of process conditions as illustrated in Table 1. In addition to these differences in the mechanism of necking and draw-down the effects of the two phenomena on the material are quite distinct. This may be illustrated by the following experiment, in which two identical cylindrical rods of polypropylene were prepared and the one (A) submitted to necking by applying a deforming tension to the ends of the rod and the other (B) submitted to draw-assisted hydrostatic extrusion with considerable draw-down. The results are tabulated below:

TABLE 2

| | Deforma-ration | Modulus (p.s.i.× $10^5$) | Break stress (p.s.i. ×$10^3$) |
|---|---|---|---|
| A | 6.8/1 | 8.24 | 29.2 |
| B | 6.8/1 | 8.42 | 42.5 |

Apart from the measurably worse physical properties of the necked rod, it had become white instead of transparent, indicating the presence of weakening defects and the density of the necked product was less than that of the starting material whereas the product of the rod submitted to our process had increased in density.

A second series of experiments involved the extrusion of polypropylene melt-extruded cylindrical billets. The general conditions were as for the first series except that the billet diameters were 0.809" giving an ideal deformation ratio of 7.25/1 and the starting temperature was as stated in each case. The results are set out in Table 3.

TABLE 3

| Overall starting temperature, °C. | Draw tension (p.s.i.) | Hydro-static extrusion pressure (p.s.i.) | Difference between die and extrudate diameters (inches ×$10^{-3}$) | Actual deformation ratio | Modulus (p.s.i.) (×$10^5$) | Break stress (p.s.i.) (×$10^3$) | Break strain, percent |
|---|---|---|---|---|---|---|---|
| Relaxation: 120 | 20 | 18,500 | +100 | 4.07 | 3.50 | 22.4 | 31 |
| Preferred process condition: 110 | 2,400 | 13,500 | 0 | 7.25 | 9.86 | 50.0 | 11 |
| Draw down: 100 | 4,640 | 11,650 | −53 | 9.88 | 14.0 | 58.0 | 6 |

TABLE 4

| Deforming draw tension (p.s.i.) | Hydrostatic extrusion pressure (p.s.i.) | Difference between die and extrudate diameters (inches ×$10^{-3}$) | Actual deformation ratio | Modulus (p.s.i.) (×$10^5$) | Break stress (p.s.i.) (×$10^3$) | Break strain, percent |
|---|---|---|---|---|---|---|
| Preferred process condition: 2,000 | 13,000 | 0 | 7.0 | 15.0 | 35.0 | 4 |
| Draw down: 4,500 | 9,050 | −43 | 10.3 | 17.0 | 38.6 | 4 |

It will be seen from these results that the actual reduction ratio was again increased far above the "boundary" value and, in the preferred case, the actual and ideal deformation were the same, this ratio also being greatly in excess of the "boundary" ratio.

In a third series of experiments, billets of glass-fibre filled polypropylene (0.794" diameter) were subjected to draw-assisted hydrostatic extrusion at an ideal deformation ratio of 7/1. The rods contained 20% by volume of glass-fibres, the starting temperature being 100° C. The results are tabulated in Table 4.

It proved impossible to extrude a glass-filled polypropylene rod at an ideal ratio of 7/1 without draw assistance. It could only be conducted with an ideal ratio of 6/1, the actual ratio being 5.7 and the modulus being $13.0 \times 10^5$ p.s.i. Although this is not strictly comparable it shows that the application of our process to filled materials gives rise to worthwhile improvements in properties.

In order to use the draw-assisted hydrostatic extrusion process to control the dimensions of extrudates having ideal reduction ratios nominally within the range normally attainable by simple hydrostatic extrusion, for example polypropylene at an ideal extrusion ratio of 3/1, it is possible to lower the temperature at which the process is carried out, as shown by the following results, obtained using the same general process with a starting temperature of 20° C.

4800 p.s.i., showing that the strength of the unoriented nose, being the same as the bulk of the material, was insufficient to withstand the necessary draw tension.

In a second experiment a polypropylene billet was de-

TABLE 5

| Deforming draw tension (p.s.i.) | Hydrostatic extrusion pressure (p.s.i.) | Difference between die and extrudate diameters (inches ×10⁻³) | Actual deformation ratio | Mechanical properties | | |
|---|---|---|---|---|---|---|
| | | | | Modulus (p.s.i.) (×10⁵) | Break stress (p.s.i.) (×10³) | Break strain, percent |
| Relaxation: *20 | 14,200 | +36 | 2.4 | 2.32 | 10,500 | 300 |
| Preferred process condition: 5,000 | 6,000 | 0 | 3.0 | 2.70 | 14,800 | 160 |

The following series of experiments were carried out to prove the applicability of our process to a wide range of orientable thermoplastic materials as typified by polyethylene terephthalate, nylon 6.6, polyacetyl and polyvinyl chloride. The results are summarised in Table 6, the general process parameters being constant as before with the exception of the ideal deformation ratio and the starting temperature which are given for each experiment. The experiments marked (*) involved no deforming draw tension and are thus included only by way of comparison. The ratios given in brackets under each material code is the appropriate "boundary" deformation ratio without draw assistance.

formed for part of its length by the extrusion drawing process described earlier, thereby producing a preferentially oriented and hence strengthened nose. The billet was then removed from the extrusion apparatus smeared with silicone grease and inserted in the drawing die. Again, after permitting the temperature of the material to stabilise at 100° C., the drawing force was increased progressively, this time up to 6,200 p.s.i. at which the billet began to draw. The process continued at a steady velocity of 4 ft./min. for some 12" during which the product issuing from the die drew down progressively to 0.178" from the original 0.305", giving a total reduction equivalent to an actual deformation ratio of 11.7/1. The process

TABLE 6

| Material | Ideal deformation ratio | Starting temperature, °C. | Draw tension (p.s.i.) | Hydrostatic extrusion pressure (p.s.i.) | Difference between die and extrudate diameters (inches × 10⁻³) | Actual deformation ratio | Mechanical properties | | |
|---|---|---|---|---|---|---|---|---|---|
| | | | | | | | Modulus (p.s.i.) (×10⁵) | Break stress (p.s.i.) (×10³) | Break strain, percent |
| P.E.T. (3.5/1) | *4 | 145 | 20 | 17,500 | +37 | 3.17 | 11.07 | 23.3 | 26 |
| | *5 | 145 | 20 | 27,000 | +58 | 3.52 | 10.82 | 20.5 | 18 |
| | 4 | 145 | 3,420 | 8,100 | +5 | 3.86 | 14.90 | 26.8 | 5 |
| | 5 | 145 | 4,500 | 9,700 | +1 | 4.97 | 20.55 | 58.0 | 6 |
| N 6.6 (4.4/1) | *5 | 180 | 20 | 24,000 | +21 | 4.38 | 8.23 | 38.4 | 14 |
| | 5 | 180 | 4,500 | 12,000 | +3 | 4.90 | 9.91 | 37.2 | 5 |
| PA (4.5/1) | *4 | 23 | 20 | 35,000 | +26 | 3.39 | 5.12 | | |
| | *4 | 150 | 20 | 5,700 | +29 | 3.32 | 5.03 | 12.8 | 4 |
| | *6 | 150 | 20 | 7,100 | +48 | 4.46 | 5.28 | 12.7 | 5 |
| | 4 | 120 | 4,500 | 12,040 | −9 | 4.25 | 10.29 | 25.2 | 5 |
| | 6 | 130 | 3,030 | 9,200 | +1 | 5.96 | 8.79 | 23.6 | 5 |
| PVC (2.1/1) | *3 | 60 | 20 | 11,000 | +75 | 1.92 | 6.20 | 9.34 | 5 |
| | 3 | 60 | 1,250 | 9,620 | +7 | 2.86 | 7.26 | 13.4 | 4 |
| | 3 | 75 | 1,250 | 5,450 | −7 | 3.15 | 7.58 | 14.8 | 4 |

It will be noted that this boundary was readily exceeded for each material and the relaxation either drastically reduced or even reversed. From the results quoted it will be readily appreciated that the preferred condition of zero relaxation could be obtained for each material by appropriate selection of draw tension and hydrostatic extrusion pressure.

The above experiments have all been concerned with draw-assisted hydrostatic extrusion, although it has been shown that by suitable enhancement of draw tension the hydrostatic pressure may be reduced to zero. The following experiments illustrate simple drawing of a rod or billet of polypropylene with a pre-strengthened "nose."

Firstly, an integral "nose" was machined on one end of a polypropylene rod, to enable this end to be pushed through a conical entry die having a 30° included angle, the diameters of the die orifice and billet being such as to yield a 4/1 ideal deformation ratio as described previously. The nose and all the surface of the billet was smeared with silicone grease to provide lubrication and it was loaded into the die. When the whole assembly had attained a uniform temperature of 100° C. the self-gripping jaws of the drawing device were attached to the billet nose which was protruding from the die exit, and the drawing force increased progressively until the nose of the billet necked and fractured at a nominal stress of continued under these steady conditions for several feet before it was stopped by removing the drawing force.

The second-mentioned drawing experiment was repeated for an ideal deformation ratio of 6:1, the temperature being increased to 114° C. at which a draw stress of 6800 p.s.i. was required to draw the material through the die. The product diameter was reduced from 0.297" to 0.190" which represents an actual deformation ratio of 15/1.

It will be appreciated from the above results that it is possible to produce extruded and/or drawn articles of a variety of thermoplastic materials having deformation ratios and hence moduli in excess of those previously attainable by such processes. For example, extruded and/or drawn articles of the following thermoplastic materials, having moduli greater than the figure shown against the material may be obtained.

| Thermoplastic material: | Highest previously attainable modulus (p.s.i. ×10⁵) |
|---|---|
| Polypropylene | 5.2 |
| Polyacetal | 5.3 |
| Polyvinyl chloride | 6.3 |
| Polyethylene terephthalate | 11.4 |
| Nylon 6.6 | 8.3 |
| Glass-fibre [1] filled polypropylene | 12.3 |

[1] Containing 20% by weight of glass fibre.

In order to establish that the increased modulus of those products of our process in which the deformation ratio boundary had been exceeded was due to increased molecular orientation of the thermoplastic material, X-ray diffraction was used. This is a technique which may be used in indicate the orientation of molecules in the crystalline regions of a material, as described in the following references. Wilchinsky, J. Applied Polymer Science 7 (1963), 923–933, Kasai and Kakudo, J. Polymer Science, Part A, 2 (1964), 1955–1966, Haffelfinger and Burton, J. Polymer Science, vol. XLVII, (1960), 289–306.

To apply this technique to the products of our process, sections were cut lengthways from them and an X-ray beam passed through the centre of and perpendicular to the plane of the section. For a section taken from a polypropylene rod prepared by our process having an actual deformation ratio of 7.4/1, the X-ray diffraction pattern, shown in FIG. 2 of the accompanying photographs, indicated a very high degree of molecular orientation. This is clearly demonstrated by the small area of the 110, 040 and 1390 reflections.

There is a significant difference between this rod, which had a high deforming draw tension applied to it during its hydrostatic extrusion, and the most highly oriented rod of polypropylene which could be produced by hydrostatic extrusion without the application of a deforming draw tension. This is clearly illustrated by FIG. 3 which shows the diffraction pattern of a sample from a rod hydrostatically extruded with an actual deformation ratio of 4.95/1 but without draw assistance. It can be seen that the reflections form larger areas, which is indicative of a smaller degree of molecular orientation, and the presence of some randomly-oriented material. FIG. 4, which consists of a diffraction pattern obtained from a suitable section of the original billet, demonstrates the lack of orientation of the starting material.

What we claim is:

1. In a process for reducing the cross-sectional area of an elongate article of a crystalline or semi-crystalline polymer at a temperature below the crystalline melting point and above the glass transition temperature, through a well-lubricated die of smaller cross-sectional area than that of the article, in which the cross-section of the article is such that the largest external dimension is at least 0.05 inch and the cross-sectional area is at least 0.01 square inch, the improvement comprising the step of forming an integral, preferentially oriented nose at one end of the article, by a solid phase deformation process, such that the tensile strength of the nose exceeds the draw tension to be applied to the article, gripping the nose, and drawing the article through the die so as to induce a substantial degree of molecular orientation throughout the drawn article, said drawing being effected by pulling the nose away from the die with deforming draw tension sufficient to cause a substantial permanent reduction in cross-sectional area and increase in length of the article additional to that caused by the solid phase deformation process but insufficient to cause fracture of the article or the formation therein of local constrictions of the type known as necking.

2. The process of claim 1 in which the solid phase deformation process which forms the integral, preferentially oriented nose in a hydrostatic extrusion process.

3. The process of claim 1 in which the thermoplastic material is selected from the group consisting of polyolefins, polyamides, polyaldehydes and polyesters.

4. The process of claim 1 in which the article is extruded through the die by hydrostatic pressure while said deforming draw tension is applied to the resultant extrudate.

5. The process of claim 4 in which the hydrostatic extrusion pressure and the deforming draw tension are so chosen that the actual deformation ratio is equal to the ideal deformation ratio whereby the cross-sectional dimensions of the extrudate equal those of the die orifice, the actual deformation ratio being defined as the ratio of the cross-sectional area of the billet to that of the extrudate, and the ideal deformation ratio being defined as the ratio of the cross-sectional area of the billet to that of the die orifice.

6. The process of claim 4 in which the hydrostatic extrusion pressure and the deforming draw tension are so chosen that the actual deformation ratio is at least equal to the ideal deformation ratio, the actual deformation ratio being defined as the ratio of the cross-sectional area of the billet to that of the extrudate, and the ideal deformation ratio being defined as the ratio of the cross-sectional area of the billet to that of the die orifice.

7. The process of claim 4 in which the thermoplastic material is selected from the group consisting of polyolefins, polyamides, polyaldehydes and polyesters.

8. The process of claim 4 in which the actual deformation ratio exceeds that attainable by hydrostatic extrusion in the absence of a deforming draw tension.

9. The process of claim 8 in which the thermoplastic material is polypropylene and the actual deformation ratio exceeds 5.1:1.

10. The process of claim 8 in which the thermoplastic material is poly(ethylene terephthalate) and the actual deformation ratio exceeds 3.5:1.

11. The process of claim 8 in which the thermoplastic material is polyacetal and the actual deformation ratio exceeds 4.4:1.

12. The process of claim 8 in which the thermoplastic material is nylon 6.6 and the actual deformation ratio exceeds 4.5:1.

13. The process of claim 8 in which the thermoplastic material is glass-fibre filled polypropylene and the actual deformation ratio exceeds 5.8:1.

14. The process of claim 8 in which the thermoplastic material is poly(vinyl chloride) and the actual deformation ratio exceeds 2.1:1.

References Cited

UNITED STATES PATENTS

| | | | |
|---|---|---|---|
| 2,291,873 | 8/1942 | Brubaker | 264—290 N |
| 2,867,848 | 1/1959 | McGlamery | 264—280 X |
| 3,083,410 | 4/1963 | McGlamery | 264—294 X |
| 3,205,289 | 9/1965 | Carpenter | 264—280 |
| 3,507,941 | 4/1970 | Kies et al. | 264—88 |
| 2,422,325 | 6/1947 | Wheelon | 264—320 X |
| 2,476,830 | 7/1949 | Spencer | 264—290 X |
| 2,661,499 | 12/1953 | James et al. | 264—209 |
| 2,423,182 | 7/1947 | Fields | 264—290 N |
| 2,669,209 | 2/1954 | Hoffman | 264—291 X |
| 3,558,580 | 1/1971 | Orser | 264—210 |
| 3,380,122 | 4/1968 | Kirk | 264—291 X |
| 3,508,553 | 4/1970 | Kanbar et al. | 264—291 X |
| 3,577,987 | 5/1970 | Bronnenkant | 264—291 X |

OTHER REFERENCES

Oleesky, Samuel S. and J Gilbert Mohr: "SPI Handbook of Reinforced Plastics," New York, Reinhold, 1964, pp. 105–106.

Boundy, Ray A. and R. F. Boyer, edt.: "Styrene: It's Polymers, Copolymers and Derivatives," New York, Reinhold, 1952, pp. 451–455; 528–531; 1147–1156.

Billmeyer, Fred W.: "Textbook of Polymer Science," New York, Interscience, 1964$_2$; pp. 164–171.

Vincent, P. T.: "The Necking and Cold-Drawing of Rigid Plastics," in Polymer, vol. 1, No. 1, March 1960, pp. 7–19.

PHILIP E. ANDERSON, Primary Examiner

U.C. Cl. X.R.

264—291, 299, 231, DIG. 66